United States Patent [19]
Okuno

[11] Patent Number: 6,105,114
[45] Date of Patent: Aug. 15, 2000

[54] TWO-DIMENSIONAL ARRAY TRANSPOSITION CIRCUIT READING TWO-DIMENSIONAL ARRAY IN AN ORDER DIFFERENT FROM THAT FOR WRITING

[75] Inventor: Tomohisa Okuno, Tenri, Japan

[73] Assignee: Sharp Kabushiki Kaisha, Osaka, Japan

[21] Appl. No.: 09/010,497

[22] Filed: Jan. 21, 1998

[30] Foreign Application Priority Data

Jan. 21, 1997 [JP] Japan ..................................... 9-008595

[51] Int. Cl.[7] ................................................. G06F 12/00
[52] U.S. Cl. ........................................... 711/155; 708/402
[58] Field of Search ..................................... 708/400, 401,
708/402; 382/250, 276, 305; 711/155, 157,
165, 217, 154; 365/189.04, 230.03, 230.05,
230.08

[56] References Cited

U.S. PATENT DOCUMENTS

| | | | |
|---|---|---|---|
| 4,791,598 | 12/1988 | Liou et al. ................................ | 708/402 |
| 5,412,740 | 5/1995 | Fadavi-Ardekani ..................... | 382/293 |
| 5,583,803 | 12/1996 | Matsumoto et al. ..................... | 708/401 |
| 5,790,712 | 8/1998 | Fandrianto et al. ..................... | 382/276 |
| 5,815,421 | 9/1998 | Dulong et al. ........................... | 708/520 |
| 5,894,430 | 4/1999 | Ohara ...................................... | 708/402 |
| 5,938,763 | 8/1999 | Fimoff et al. ........................... | 712/300 |

FOREIGN PATENT DOCUMENTS 6-223099  8/1994  Japan .

OTHER PUBLICATIONS

"A 100 MHz 2–D Discrete Cosine Transform Core Processor", Uramoto et al., IEEE Journal Of Solid State Circuits, vol. 27, No. 4, Apr., 1992.

*Primary Examiner*—Do Hyun Yoo
*Assistant Examiner*—Gary J. Portka
*Attorney, Agent, or Firm*—Nixon & Vanderhye P.C.

[57] ABSTRACT

A two-dimensional array transposition circuit having a small circuit scale and accordingly having a small power consumption includes a memory cell array capable of storing a two-dimensional array and an address translation circuit receiving an address signal and generating a row address signal and a column address signal for specifying a memory cell of the memory cell array via a row decoder and a column decoder. The address translation circuit generates, when one two-dimensional array is written into the memory cell array, a row address signal and a column address signal successively such that an order of writing is according to one of an order giving priority to a row direction and selecting a memory cell and an order giving priority to a column direction and selecting a memory cell and generates, when the two-dimensional array is read from the memory cell array, a row address signal and a column address signal successively such that an order of reading is according to the other order.

28 Claims, 9 Drawing Sheets

FIG. 3A
PRIOR ART
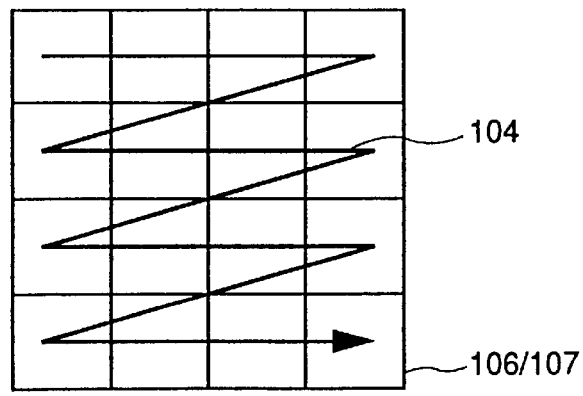
FIG. 3B
PRIOR ART
| 0 | 1 | 2 | 3 |
|---|---|---|---|
| 4 | 5 | 6 | 7 |
| 8 | 9 | 10 | 11 |
| 12 | 13 | 14 | 15 |
106/107
FIG. 3C
PRIOR ART
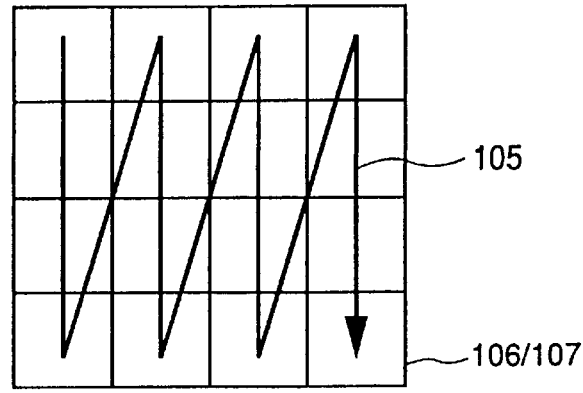

FIG. 4    PRIOR ART

| 0 | 1 | 2 | • | • | • | N-2 | N-1 |
|---|---|---|---|---|---|---|---|
| N | N+1 | • | • | • | • | • | 2N-1 |
| 2N | • | • | • | • | • | • | • |
| • | • | • | • | • | • | • | • |
| • | • | • | • | • | • | • | • |
| • | • | • | • | • | • | • | • |
| $N^2$-2N | • | • | • | • | • | • | $N^2$-N-1 |
| $N^2$-N | • | • | • | • | • | $N^2$-2 | $N^2$-1 |

FIG. 9

|  | ROW ADDRESS | | | | | | | |
|---|---|---|---|---|---|---|---|---|
|  | 0 | 1 | 2 | 3 | 4 | 5 | 6 | 7 |
| 0 | (0,0) | (1,0) | (2,0) | (3,0) | (4,0) | (5,0) | (6,0) | (7,0) |
| 1 | (0,1) | (1,1) | (2,1) | (3,1) | (4,1) | (5,1) | (6,1) | (7,1) |
| 2 | (0,2) | (1,2) | (2,2) | (3,2) | (4,2) | (5,2) | (6,2) | (7,2) |
| 3 | (0,3) | (1,3) | (2,3) | (3,3) | (4,3) | (5,3) | (6,3) | (7,3) |
| 4 | (0,4) | (1,4) | (2,4) | (3,4) | (4,4) | (5,4) | (6,4) | (7,4) |
| 5 | (0,5) | (1,5) | (2,5) | (3,5) | (4,5) | (5,5) | (6,5) | (7,5) |
| 6 | (0,6) | (1,6) | (2,6) | (3,6) | (4,6) | (5,6) | (6,6) | (7,6) |
| 7 | (0,7) | (1,7) | (2,7) | (3,7) | (4,7) | (5,7) | (6,7) | (7,7) |

COLUMN ADDRESS

FIG. 10A

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 10B

| 0 | 8 | 16 | 24 | 32 | 40 | 48 | 56 |
|---|---|---|---|---|---|---|---|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |

FIG. 11B

| V'(0) | V'(8) | V'(16) | V'(24) | V'(32) | V'(40) | V'(48) | V'(56) |
| --- | --- | --- | --- | --- | --- | --- | --- |
| V'(1) | V'(9) | V'(17) | V'(25) | V'(33) | V'(41) | V'(49) | V'(57) |
| V'(2) | V'(10) | V'(18) | V'(26) | V'(34) | V'(42) | V'(50) | V'(58) |
| V'(3) | V'(11) | V'(19) | V'(27) | V'(35) | V'(43) | V'(51) | V'(59) |
| V'(4) | V'(12) | V'(20) | V'(28) | V'(36) | V'(44) | V'(52) | V'(60) |
| V'(5) | V'(13) | V'(21) | V'(29) | V'(37) | V'(45) | V'(53) | V'(61) |
| V'(6) | V'(14) | V'(22) | V'(30) | V'(38) | V'(46) | V'(54) | V'(62) |
| V'(7) | V'(15) | V'(23) | V'(31) | V'(39) | V'(47) | V'(55) | V'(63) |

FIG. 11A

| V(0) | V(1) | V(2) | V(3) | V(4) | V(5) | V(6) | V(7) |
| --- | --- | --- | --- | --- | --- | --- | --- |
| V(8) | V(9) | V(10) | V(11) | V(12) | V(13) | V(14) | V(15) |
| V(16) | V(17) | V(18) | V(19) | V(20) | V(21) | V(22) | V(23) |
| V(24) | V(25) | V(26) | V(27) | V(28) | V(29) | V(30) | V(31) |
| V(32) | V(33) | V(34) | V(35) | V(36) | V(37) | V(38) | V(39) |
| V(40) | V(41) | V(42) | V(43) | V(44) | V(45) | V(46) | V(47) |
| V(48) | V(49) | V(50) | V(51) | V(52) | V(53) | V(54) | V(55) |
| V(56) | V(57) | V(58) | V(59) | V(60) | V(61) | V(62) | V(63) |

FIG. 12A
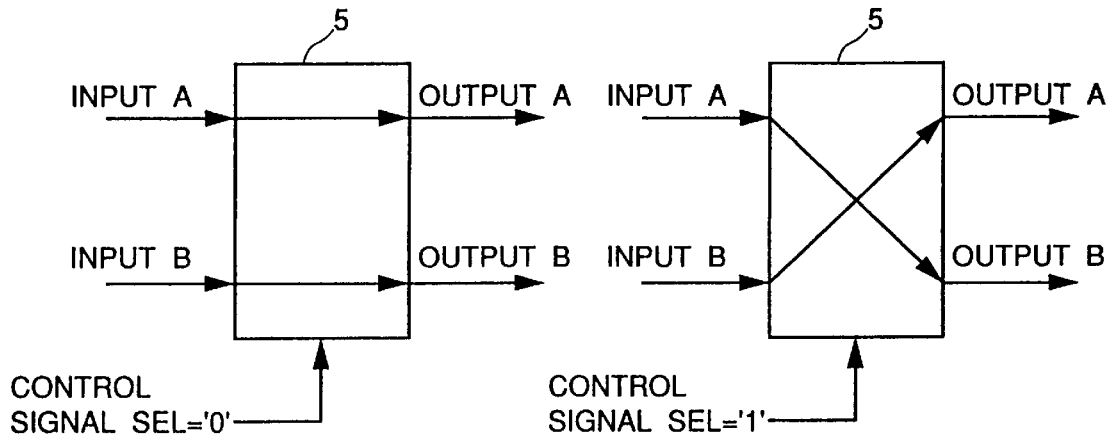
FIG. 12B
FIG. 13
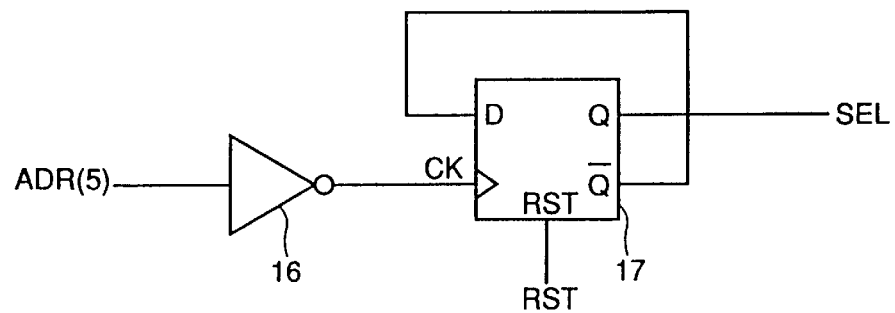

TWO-DIMENSIONAL ARRAY TRANSPOSITION CIRCUIT READING TWO-DIMENSIONAL ARRAY IN AN ORDER DIFFERENT FROM THAT FOR WRITING

BACKGROUND OF THE INVENTION

1. Field of the Invention

The present invention relates to a two-dimensional array transposition circuit reading a two-dimensional array in an order different from that for writing. The invention more specifically relates to a two-dimensional array transposition circuit having a small circuit scale and small power consumption.

2. Description of the Background Art

A high-efficiency coding system for image data such as MPEG (Moving Picture Experts Group) 2 which is being developed now is based on a transform coding technique using two-dimensional discrete cosine transform (DCT). The transform coding refers to a coding system for reducing the spatial redundancy of image data. Reduction in the spatial redundancy of image data is achieved by transforming image data onto an axis of spatial frequency using orthogonal transformation, and coding only a component on which energy is concentrating.

Examples of the orthogonal transformation are, in addition to the two-dimensional DCT, two-dimensional fast Fourier transform (FFT) employed for filtering of an image, Hadamard transform by which simplification of hardware is possible, Karhunen-Loéve transform (K-L transform) with a highly efficient coding but with its operation process more complex than the two-dimensional DCT, and the like.

The two-dimensional DCT is employed below as a representative orthogonal transformation and a method of implementing the two-dimensional DCT for image data is described. A similar configuration can be used for implementing the two-dimensional FFT or the like.

Image data is divided into blocks formed of N×N pixels. The two-dimensional DCT is performed for respective blocks. The two-dimensional DCT is implemented by equation (1).

$$F(u, v) = \frac{2c(u)c(v)}{N} \sum_{i=0}^{N-1} \sum_{j=0}^{N-1} f(i, j) \cos\frac{(2i+1)u\pi}{2N} \cos(2j+1)v\frac{\pi}{2N} \quad (1)$$

$$c(u), c(v) = \begin{cases} \frac{1}{2^{\frac{1}{2}}} & u, v = 0 \\ 1 & u, v = 1, 2, \ldots, N-1 \end{cases}$$

In equation (1), f(i, j)(i, j=0, 1, ..., N-1) is an original signal of an image, and F(u, v)(u, v=0, 1, ..., N-1) is a coefficient obtained by the transformation. The operation performed for the two-dimensional DCT can be understood as substantially the product-sum operation from equation (1). Although to make the two-dimensional DCT circuit into a Large Scale Integrated Circuit (LSI) has been considered to be difficult since a significant amount of hardware is required for implementing a multiplier, improvement of the micro lithography and investigation of fast algorithm enables implementation of LSI.

However, to execute equation (1) exactly is actually difficult still now in view of the circuit scale. A generally employed method is to divide the two-dimensional DCT into row-direction one-dimensional DCT and column-direction one-dimensional DCT.

Referring to FIG. 1, a conventional two-dimensional DCT device includes: a row-direction one-dimensional DCT circuit 100 receiving input data for performing the one-dimensional DCT in a row direction; a two-dimensional array transposition circuit (hereinafter referred to as "transposition memory circuit") 101 receiving a two-dimensional array formed of one-dimensional arrays supplied from row-direction one-dimensional DCT circuit 100, and transposing the two-dimensional array for outputting it; and a column-direction one-dimensional DCT circuit 102 receiving successively the one-dimensional arrays constituting a two-dimensional array supplied from transposition memory circuit 101 and performing one-dimensional DCT in column direction for outputting a transformation coefficient obtained by the two-dimensional DCT.

Referring to FIG. 2, transposition memory circuit 101 includes: two memory cell arrays 106 and 107 each formed of N×N pixels; a switch 108 for switching input/output to/from memory cell arrays 106 and 107 by an external control signal; and address translation circuits 109 and 110 for translating an address signal into a read/write address for memory cell arrays 106 and 107.

Methods of implementing the one-dimensional DCT are briefly described first. The methods of implementing the one-dimensional DCT can be roughly divided into two methods. The first one is to perform operation according to a defining equation of the one-dimensional DCT. According to this method, if image data is divided into blocks each formed of 8×8 pixels, for example, a parallel operation using eight multipliers or a series operation using one multiplier is performed.

The second method is the one using a fast algorithm. One example of the algorithm is the one by Chen in which the number of multiplications is reduced by 50% using the symmetricalness of a coefficient matrix of the product-sum operation. One example of implementation of the one-dimensional DCT utilizing the Chen's algorithm is disclosed in *IEEE Journal of Solid-State Circuits,* vol. 27, No. 4, April 1992, S. Uramoto et al., "A 100-MHz 2-D Discrete Cosine Transform Core Processor."

An operation of transposition memory circuit 101 is next described. Transposition memory circuit 101 receives an output array which was subjected to the row-direction one-dimensional DCT by circuit 100, and outputs the array as an input array for circuit 102 to perform the column-direction one-dimensional DCT. An input array required by circuit 102 is the one generated by writing the output array from circuit 100 into memories 106 and 107 in a two-dimensional array, transposing the written two-dimensional array and reading a resultant array. Transposition memory circuit 101 writes the output array from circuit 100 into memories 106 and 107 in a two-dimensional array, transposes it, reads a resultant array and supplies it to circuit 102.

Suppose that N=4 for the N×N data block. It is assumed that an output array from circuit 100 is

{0, 1, 2, 3, 4, 5, 6, 7, 8, 9, 10, 11, 12, 13, 14, 15} and these elements are successively output from the leftmost element of the array above. As shown in FIG. 3A, data are supplied to memory cell arrays 106/107 in the order shown by the arrow 104. FIG. 3B shows a two-dimensional array of the data in memory cell arrays 106/107 immediately after the data are supplied.

On the other hand, an input array required when the column-direction DCT is performed by circuit 102 is the one obtained by exchanging the row and column of the two-dimensional array and reading a resultant array, that is, $$\{0, 4, 8, 12, 1, 5, 9, 13, 2, 6, 10, 14, 3, 7, 11, 15\}.$$

The array above is obtained by reading data from memory cell arrays 106/107 in the order of the arrow 105 as shown in FIG. 3C.

If switch 108 is in the state shown in FIG. 2, transposition memory circuit 101 receives an output from row-direction one-dimensional DCT circuit 100 (pre-stage DCT output) and writes it into memory cell array 106. Further, transposition memory circuit 101 reads data from memory cell array 107 as an input to column-direction one-dimensional DCT circuit 102 (post-stage DCT input). In this case, suppose that an address of each memory cell is as shown in FIG. 4, then an address supplied by address translation circuit 109 to memory cell array 106 is the one shown below which is an address in which priority is given to the row direction (row direction priority address).

$$\{0, 1, 2, \ldots, N, N+1, N+2, \ldots, N^2-2, N^2-1\}$$

On the other hand, an address supplied by address translation circuit 110 to memory 107 is the one shown below which is an address in which priority is given to the column direction (column direction priority address).

$$\{0, N, 2N, \ldots, 1, N+1, 2N+1, \ldots, N^2-N-1, N^2-1\}$$

In transposition memory circuit 101, when writing of data corresponding to one block formed of N×N pixels into one memory cell array (memory cell array 106 in FIG. 2) and reading of data from the other memory cell array (memory cell array 107 in FIG. 2) are completed, a control signal in synchronization with each data block (one data block is constituted of $N^2$ data) causes switch 108 to change its state and operations carried out in respective memory cell arrays 106 and 107 become opposite to that described above.

Specifically, the pre-stage DCT output is written into memory cell array 107, and the post-stage DCT input is read from memory cell array 106. At this time, an address supplied to each memory cell array is a column direction priority address for memory cell array 106 and a row direction priority address for memory cell array 107.

As described above, data in a preceding block written into memory cell array 106 with a row direction priority address is read with a column direction priority address during data in a current block is written into memory cell array 107, so that the transposition operation is achieved.

Although such a transposition memory circuit for a square two-dimensional array is disclosed in Japanese Patent Laying-Open No. 6-223099, a specific example of a configuration of the transposition memory circuit is not described in the publication.

However, the configuration of the conventional transposition memory circuit 101 requires two memory cell arrays 106 and 107, resulting in a large circuit scale.

In addition, an important object of the current LSI development is to reduce power consumption. One approach of reducing power consumption is to lower supply voltage or the like. In addition, to reduce the number of signal transition is also one approach thereof.

Since in the configuration of the conventional transposition memory circuit 101, data are read/write from/into two memory cell arrays 106 and 107 independently of each other, the number of signal transition increases to make the reduction of power consumption difficult.

SUMMARY OF THE INVENTION

One object of the present invention is to provide a two-dimensional array transposition circuit having a reduced amount of memory for reducing circuit scale and power consumption.

A two-dimensional array transposition circuit according to one aspect of the invention includes: a memory cell array in which each element of a two-dimensional array formed of N rows and N columns can be written and read synchronously with a clock signal into and from a memory cell selected by a row and a column specified respectively by a row address signal and a column address signal; a row decoder for the memory cell array; a column decoder for the memory cell array; and an address translation circuit for generating a row address signal and a column address signal successively and supplying them to the row decoder and the column decoder for each two-dimensional array. N is $2^i$ (i is a natural number). The address translation circuit includes an $N^2$ counter responsive to a system clock signal in synchronization with a clock signal to update an output and responsive to a reset signal to reset the output, a toggle counter receiving a prescribed bit of an output from the $N^2$ counter and changing its state, and a two-input two-output selector receiving higher i-bit and lower i-bit from the $N^2$ counter and distributing them depending on an output from the toggle counter for supplying them to the row and column decoders.

According to the present invention, a row address signal and a column address signal can be generated such that the orders of writing and reading into and from the memory cell array are different from each other for a two-dimensional array. Accordingly, transposition of the two-dimensional array is possible with one memory cell array without using two memory arrays as in the conventional circuit. As a result, the circuit scale can be reduced to decrease power consumption.

A two-dimensional orthogonal transformer according to another aspect of the invention includes: a first one-dimensional orthogonal transformer for performing one-dimensional orthogonal transformation; a memory cell array in which each element of a two-dimensional array formed of N rows and N columns constituted of an output from the first one-dimensional orthogonal transformer can be written and read synchronously with a clock signal into and from a memory cell selected by a row and a column specified respectively by a row address signal and a column address signal; a row decoder for the memory cell array; a column decoder for the memory cell array; an address translation circuit for generating a row address signal and a column address signal successively and supplying them respectively to the row decoder and the column decoder for each two-dimensional array; and a second one-dimensional orthogonal transformer for successively performing one-dimensional orthogonal transformation for a one-dimensional array constituting a two-dimensional array read from the memory cell array. N is $2^i$ (i is a natural number). The address translation circuit includes an $N^2$ counter responsive to a system clock signal in synchronization with a clock signal to update an output and responsive to a reset signal to reset the output, a toggle counter receiving a prescribed bit of an output from the $N^2$ counter and changing its state, and a two-input two-output selector receiving higher i-bit and lower i-bit from the $N^2$ counter and distributing them depending on an output from the toggle counter for supplying them to the row decoder and the column decoder.

According to the present invention, a row address signal and a column address signal of the memory cell array can be generated such that the orders of writing and reading into and from the memory cell array are different from each other for a two-dimensional array constituted of an output from the first one-dimensional orthogonal transformer. Therefore, transposition of a two-dimensional array is possible with one memory cell array without using two memory cell arrays as in the conventional circuit. As a result, the circuit scale can be reduced and the power consumption can be decreased accordingly.

Preferably, the first one-dimensional orthogonal transformer and the second one-dimensional orthogonal transformer each includes a one-dimensional discrete cosine transformer.

According to the invention, a two-dimensional discrete cosine transformer can be provided having a small circuit scale and small power consumption.

A two-dimensional array transposition circuit according to still another aspect of the invention includes: a memory cell array formed of memory cells arranged in a matrix in a first direction and a second direction in which simultaneous writing and reading into and from a memory cell specified by an address signal is possible; an address output circuit successively outputting address signals of a first direction priority and a second direction priority of the memory cell array by switching them every time the writing and reading of one block of a two-dimensional array are carried out into/from the memory cell array; and a circuit for reading data from an address designated by an output from the address output circuit and outputting the data, and writing an element of a next two-dimensional array into the address.

According to the present invention, writing and reading for the same two-dimensional array are carried out such that different directions are given priority in the writing and reading. Transposition of a two-dimensional array is thus possible with one memory cell array without using two memory cell arrays as in the conventional circuit. As a result, a small circuit scale and a small power consumption are achieved. Further, reading of a two-dimensional array from a memory cell and writing of a next two-dimensional array into the memory cell can be simultaneously carried out. Therefore, transposition of a two-dimensional array with the same processing speed as the conventional circuit is possible.

A two-dimensional orthogonal transformer according to still another aspect of the invention includes: a first one-dimensional orthogonal transformer for performing one-dimensional orthogonal transformation; a memory cell array formed of memory cells arranged in a matrix in a first direction and a second direction in which writing and reading into and from a memory cell specified by an address signal is possible; an address output circuit successively outputting a first direction priority address and a second direction priority address of the memory cell array by switching them every time writing and reading of one block of a two-dimensional array into and from the memory cell array are carried out; a circuit for reading data from an address specified by an output from the address output circuit and outputting the data, and writing an element of a next two-dimensional array into the address; and a second one-dimensional orthogonal transformer for successively performing one-dimensional orthogonal transformation for a one-dimensional array constituting a two-dimensional array read from the memory cell array.

According to the present invention, writing and reading for the same two-dimensional array are carried out such that different directions are given priority in writing and reading. As a result, transposition of a two-dimensional array is possible with one memory cell array without using two memory cell arrays as in the conventional circuit. A small circuit scale and a small power consumption can be achieved accordingly. Further, reading of a two-dimensional array constituted of an output from the first one-dimensional orthogonal transformer from a memory cell and writing of a next two-dimensional array into the memory cell can be simultaneously carried out, so that transposition of a two-dimensional array with the same processing speed as the conventional circuit is possible.

Preferably, the first one-dimensional orthogonal transformer and the second one-dimensional orthogonal transformer each includes a one-dimensional discrete cosine transformer.

According to the present invention, a two-dimensional discrete cosine transformer can be provided having a small circuit scale and a small power consumption. Further, two-dimensional discrete cosine transformation is possible with the same processing speed as the conventional circuit.

A method of performing transposition of a two-dimensional array using a memory cell array formed of memory cells arranged in a matrix in a first direction and a second direction according to still another aspect of the invention includes the steps of: writing successively each element of a two-dimensional array corresponding to one block into an address of the memory cell array designated according to an address signal with a first direction priority reading data from an address of the memory cell array designated according to an address signal with a priority of a direction different from the direction used for writing of each element of a two-dimensional array corresponding to an immediately preceding one block, and writing each element of a two-dimensional array corresponding to a next block such that the reading and writing are successively carried out until data corresponding to one block is processed; and repeating the steps of reading and writing a prescribed time.

According to the invention, addresses with priority of different directions are respectively generated for writing and reading of the same two-dimensional array into and from a memory cell array. Therefore, transposition of a two-dimensional array with one memory cell array is possible without using two memory cell arrays as in the conventional circuit. Further, reading of a two-dimensional array from a memory cell and writing of a next two-dimensional array into the memory cell can be carried out simultaneously. Transposition of a two-dimensional array with the same processing speed as the conventional circuit is possible. Reduction of a scale of a circuit to which the present invention is applied is possible and power consumption can be decreased accordingly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–3C schematically show transposition operation.

FIG. 4 shows addresses of respective memory cells according to the conventional technique.

FIG. 9 shows addresses of a memory cell array according to the embodiment.

FIGS. 10A and 10B show address signals corresponding to respective memory cells according to two methods of address designation in the embodiment.

FIGS. 11A and 11B respectively show two-dimensional arrays of data of a leading block and data of a second block.

FIGS. 12A and 12B each shows an operation of an address translation circuit according to the embodiment.

FIG. 13 shows a configuration of a control signal generation circuit in the embodiment.

DESCRIPTION OF THE PREFERRED EMBODIMENTS

Figure 1:
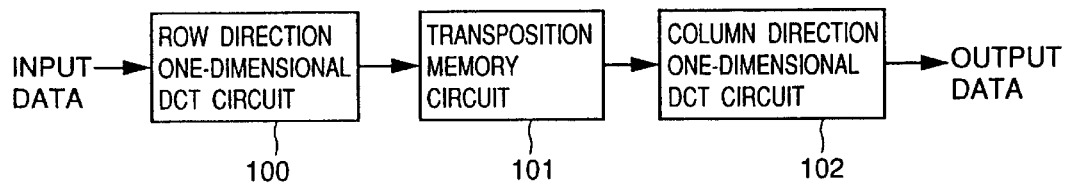
FIG. 1 is a block diagram showing a configuration of a conventional two-dimensional DCT.
Figure 2:
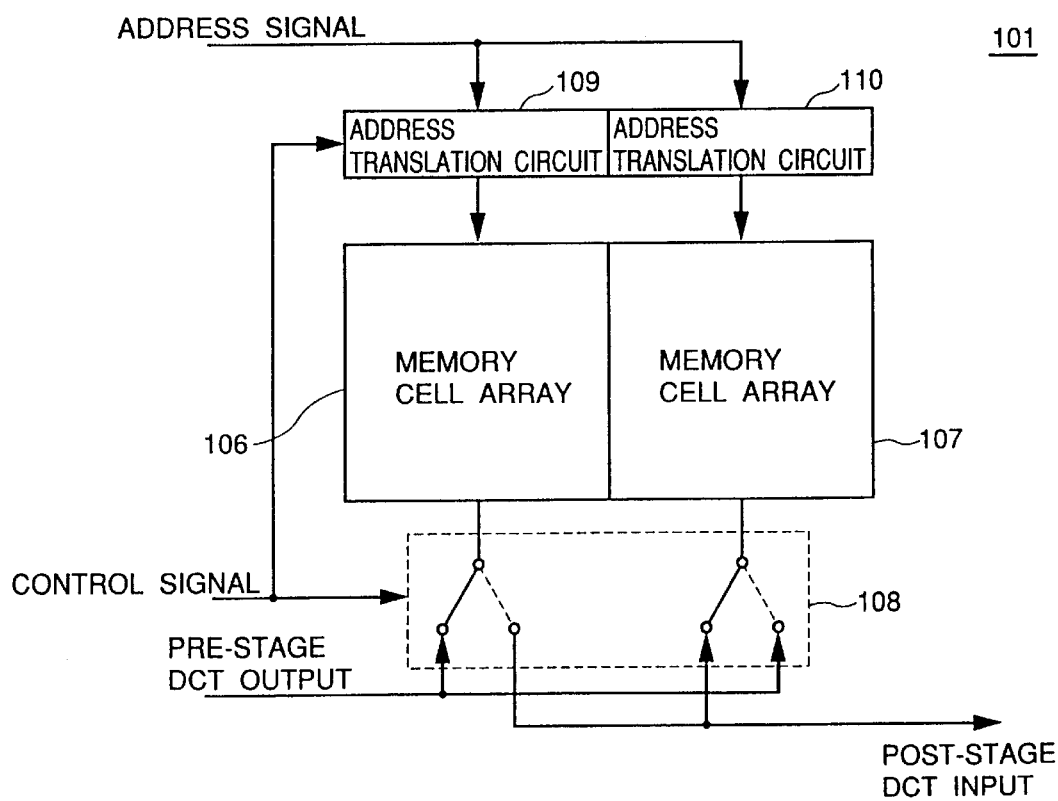
FIG. 2 shows a configuration of a transposition memory circuit according to the conventional technique.

A two-dimensional DCT device according to one embodiment of the present invention employs, in the configuration of the two-dimensional DCT device described referring to FIG. 1, a transposition memory circuit 1 performing two-dimensional array transposition with one block formed of 8×8 pixels instead of employing transposition memory circuit 100.

Figure 5:
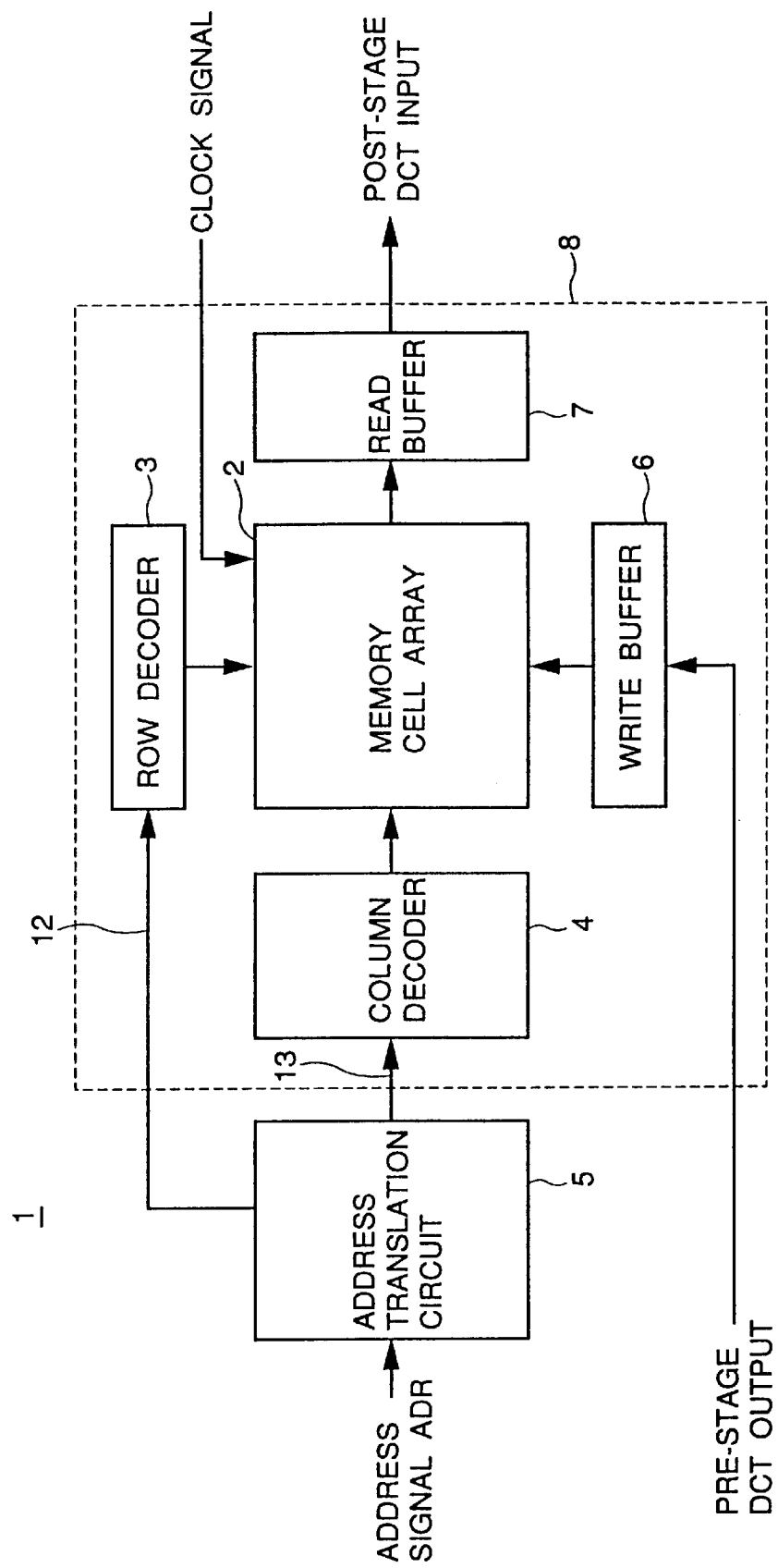
FIG. 5 is a block diagram of a two-dimensional array transposition circuit according to the embodiment.

With reference to FIG. 5, transposition memory circuit 1 includes an address translation circuit 5 receiving an address signal ADR for performing a passing operation or a switching operation (that are described below), and includes a memory system 8 for receiving an output from address translation circuit 5 and an output of DCT of a preceding stage (pre-stage DCT output) and outputting an input of DCT of a following stage (post-stage DCT input) obtained by transposition of the pre-stage DCT output.

Memory system 8 includes a memory cell array 2 having 8×8 memory cells for, responsive to a clock signal in synchronization and in phase with a system clock signal, writing data held by a write buffer 6 (described below) thereto at rising of the clock signal and for reading data therefrom into a read buffer 7 (described below) at falling of the clock signal, write buffer 6 for receiving a pre-stage DCT output and holding it, read buffer 7 for holding data read from memory cell array 2 and outputting it as a post-stage DCT input, and a row decoder 3 and a column decoder 4 each connected to address translation circuit 5, receiving an output from address translation circuit 5 via signal lines 12 and 13 respectively, decoding it, and designating an address of memory cell array 2. The clock signal supplied to memory cell array 2 may be opposite in phase to the system clock signal, and data may be read at rising of the clock signal and written at falling of the clock signal.

Figure 6:
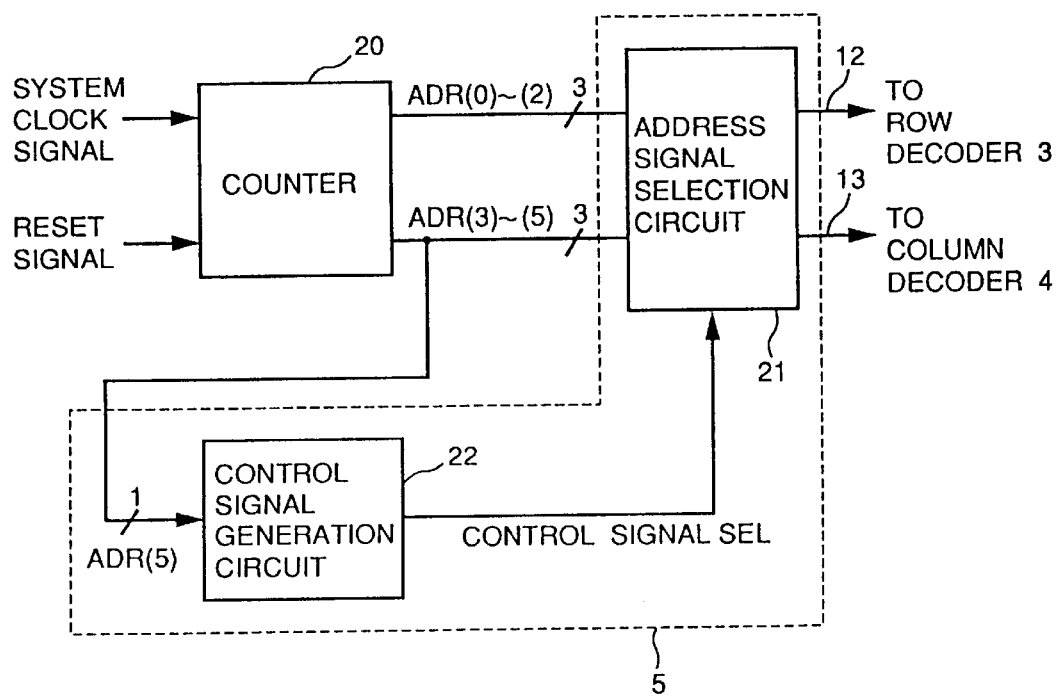
FIG. 6 is a block diagram of an address translation circuit according to the embodiment.

Referring to FIG. 6, address translation circuit 5 includes an address signal selection circuit (hereinafter referred to as "two-input two-output selector") 21 receiving a 6-bit address signal ADR and a control signal SEL, for supplying one of lower 3 bits ADR (0)–(2) and higher 3 bits ADR (3)–(5) of address signal ADR to row decoder 3 and supplying the other to column decoder 4 according to a value of control signal SEL, and includes a control signal generation circuit 22 receiving the most significant bit ADR (5) of address signal ADR for outputting control signal SEL which changes every time address signal ADR is reset to 0.

Address signal ADR is output from a counter 20. Counter 20 is responsive to a system clock signal to increment address signal ADR by one, and responsive to a reset signal to reset address signal ADR to 0.

Figure 7:
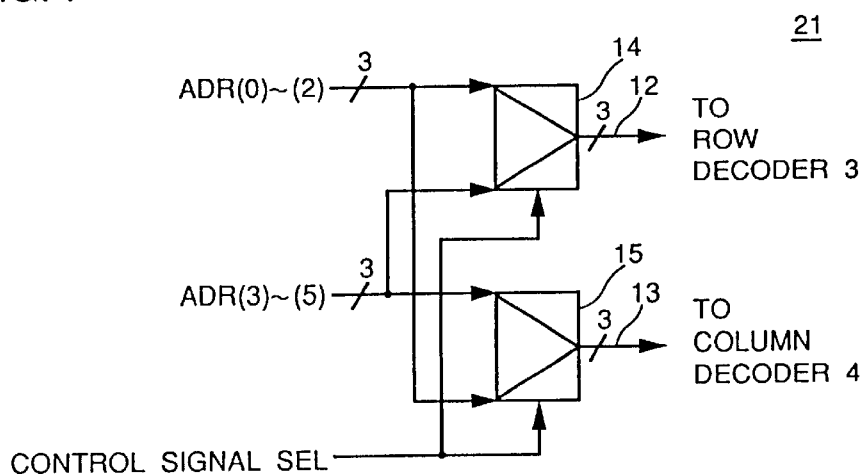
FIG. 7 shows a configuration of an address signal selection circuit according to the embodiment.

Referring to FIG. 7, address signal selection circuit 21 includes selectors 14 and 15 respectively connected to row decoder 3 and column decoder 4, each receiving lower 3 bits ADR (0)–(2) and higher 3 bits ADR (3)–(5) of address signal ADR, and each receiving control signal SEL. If one of the selectors supplies ADR (0)–(2) to row decoder 3, the other of the selectors supplies ADR (3)–(5) to column decoder 4. If one of the selectors supplies ADR (3)–(5) to row decoder 3, the other supplies ADR (0)–(2) to column decoder 4. Internal configurations of selectors 14 and 15 may be any if they are 3-bit two-input one-output selectors by which an output is selected according to control signal SEL.

Figure 8B:
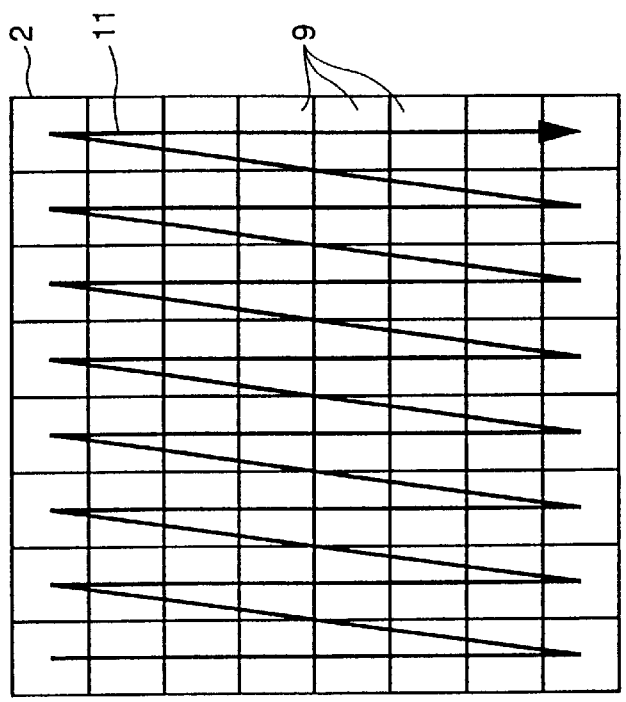
FIGS. 8A and 8B show two orders of designating an address by an address signal according to the embodiment.
Figure 8A:
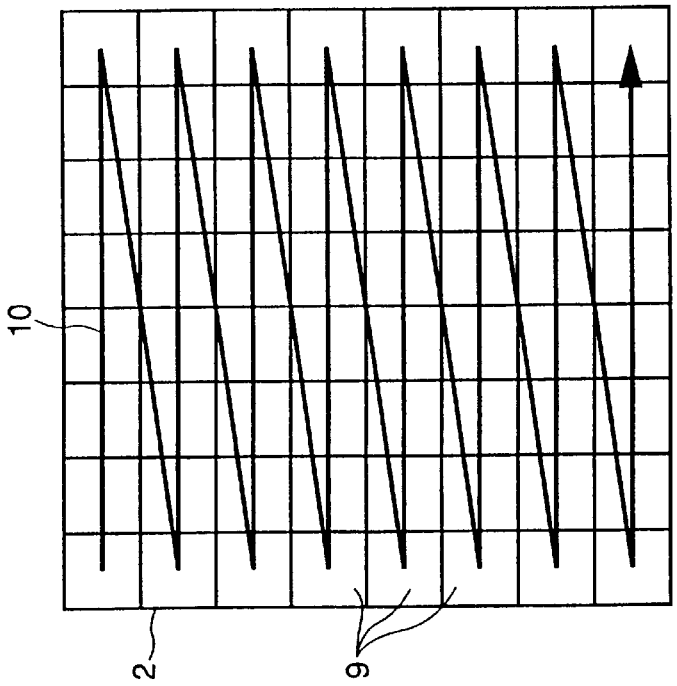

A function of transposition memory circuit 1 is to convert an array of a pre-stage DCT output into an array required for a post-stage DCT input. In the two-dimensional DCT device, if data of an output array of a pre-stage DCT is written into each memory cell 9 shown in FIG. 8A in the order as shown by an arrow 10, an array required as an array for a post-stage DCT input is obtained by reading in the order shown by an arrow 11 of FIG. 8B. On the other hand, if a data block is written in the order shown by arrow 11 of FIG. 8B, an array desired as a post-stage DCT input is the one obtained by reading in the order shown by arrow 10 of FIG. 8A.

Write buffer 6 and read buffer 7 can write and read image data into and from memory cell array 2 simultaneously and independently of each other. Memory system 8 has a configuration of 2-port memory.

Address signal ADR is decoded by row decoder 3 and column decoder 4 and designates an address of memory cell array 2. Address signal ADR is generated in synchronization with an array of a pre-stage DCT output. An array of values is as follows.

$$\{0, 1, 2, 3, 4, 5, 6, 7, 8, \ldots, 61, 62, 63\} \qquad \text{ARRAY (1)}$$

Each value is transmitted with a 6-bit signal as address signal ADR. In other words, address signal ADR supplied to address translation circuit 5 is 6 bits.

Address translation circuit 5 supplies higher 3 bits and lower 3 bits of address signal ADR to signal lines 12 and 13 respectively connected to column decoder 3 and row decoder 4. At this time, address translation circuit 5 carries out a passing operation for supplying lower 3 bits and higher 3 bits of address signal ADR respectively to signal line 12 connected to row decoder 3 and signal line 13 connected to column decoder 4, or a switching operation for supplying lower 3 bits and higher 3 bits respectively to signal line 13 connected to column decoder 4 and signal line 12 connected to row decoder 3.

Memory cell array 2 is provided with 8×8 memory cells. An address of each memory cell is represented by (row address, column address) as shown in FIG. 9. When data is written into a memory cell, an address of the memory cell to which data is written is designated by address signal ADR.

An address designated by one address signal ADR is described. Suppose that a value represented by higher 3 bits of an address signal is U and a value represented by lower 3 bits is L. If address translation circuit 5 performs the passing operation and higher 3 bits and lower 3 bits are decoded respectively by column decoder 4 and row decoder 3, a designated address is (L, U).

If address translation circuit 5 carries out the switching operation, and higher 3 bits and lower 3 bits are decoded respectively by row decoder 3 and column decoder 4, a designated address is (U. L). A specific example is described below.

If a value of address signal ADR is 23, address signal ADR is '010111'. If the passing operation is carried out by address translation circuit 5, higher 3 bits or '010' is decoded by column decoder 4, and lower 3 bits or '111' are decoded by row decoder 3. In this case, a value represented by higher 3 bits '010' is 2 and a value represented by lower 3 bits '111' is 7, and a designated address is (7, 2).

If address translation circuit 5 carries out the switching operation with address signal ADR similar to the signal above, a designated address is (2, 7). Accordingly, an address designated by 6-bit address signal ADR is set to be one of the two patterns by the operation by address translation circuit 5.

Specifically, if address translation circuit 5 carries out the passing operation, values of address signal ADR corresponding to respective memory cells are those as shown in FIG. 10A. On the other hand, if address translation circuit 5 carries out the switching operation, values thereof are those as shown in FIG. 10B.

An actual transposing operation is hereinafter described. First a writing operation of a pre-stage DCT output of a leading block of image data into memory cell array 2 is described. The pre-stage DCT output of one block has 64 data. Suppose that the array is the following array (2).

$$\{V(0), V(1), V(2), V(3), \ldots, V(62), V(63)\} \qquad \text{ARRAY (2)}$$

Each data is written into a corresponding memory cell of an address designated by address signal ADR shown by array (1). Specifically, V(0) of the pre-stage DCT output is written into a memory cell of an address designated by address signal ADR having a value of 0, and V(1) of the pre-stage DCT output is written into a memory cell of an address designated by address signal ADR having a value of 1.

Since address translation circuit 5 carries out the passing operation when the pre-stage DCT output of the leading block is written, a memory cell designated by each address signal ADR is as shown in FIG. 10A. Therefore, a two-dimensional array of data of the pre-stage DCT output written into each memory cell is as shown in FIG. 11A.

Next a reading operation of data of the two-dimensional array of the leading block which has been written already (see FIG. 11A), as well as a writing operation of a pre-stage DCT output of a second block are described.

In this case, address translation circuit 5 carries out the switching operation. Accordingly, memory cells designated by respective address signals ADR are as shown in FIG. 10B. Data written into a memory cell designated according to the order of array (1) of address signal ADR is read, so that an array of data of the leading block which is to be read is as shown by array (3).

$$\{V(0), V(8), V(16), V(24), V(32), V(40), V(48), V(56), V(1),$$
$$V(9), V(17), V(25), V(33), V(41), V(49), V(57), V(2), V(10), \ldots$$
$$\ldots, V(63)\} \qquad \text{ARRAY (3)}$$

Transposition and reading of data desired as a post-stage DCT input are thus implemented. In transposition memory circuit 1 according to this embodiment, write buffer 6 and read buffer 7 can write and read data into and from memory cell array 2 simultaneously and independently of each other, and memory system 8 is 2-port memory. Therefore, in this embodiment, in reading of array (3), when reading of data from each memory cell is completed, writing operation of next data is carried out.

Suppose that data to be written is a pre-stage DCT output of the second block, and its array is the array (4) shown below.

$$\{V'(0), V'(1), V'(2), V'(3), \ldots, V'(63)\} \qquad \text{ARRAY (4)}$$

From a memory cell in which reading of data completes, data is successively written thereto. As a result, data in each memory cell for which the writing completes is as shown in FIG. 11B.

Next a reading operation of data of the two-dimensional array of the second block (see FIG. 11B) from memory cell array 2, and a writing operation of a pre-stage DCT output of a third block are hereinafter described. In this case, address translation circuit 5 carries out the passing operation. Accordingly, a memory cell designated by address signal ADR shown by array (1) is the one as shown in FIG. 10A, and data of the two-dimensional array of the second block is transposed to be read as a post-stage DCT input. Data of the pre-stage DCT output of the third block are written successively into memory cells starting from a memory cell for which the reading operation completes similarly to the case described above.

Transposing and reading of data is thereafter carried out which is written in a two-dimensional array into memory cell array 2 such that the passing and switching operations are performed alternately for each data block by address translation circuit 5.

Referring back to FIG. 7, an operation of address translation circuit 5 is described.

Address signal ADR according to this embodiment is preliminary divided into lower 3 bits of ADR (0)–(2) and higher 3 bits of ADR (3)–(5). If control signal SEL is '0', selectors 14 and 15 select an input of the upper side in the figure. At this time, lower 3-bit ADR (0)–(2) is supplied to signal line 12 connected to row decoder 3. ADR (3)–(5) of higher bits is supplied to signal line 13 connected to column decoder 4.

The operation of address translation circuit 5 corresponds to the passing operation. In other words, address translation circuit 5 generates an address required in writing operation of data of the leading block and the third block as described for the operation above.

If control signal SEL is '1', ADR (0)–(2) is supplied to signal line 13 to be input to column decoder 4. ADR (3)–(5) is supplied to signal line 12 to be input to row decoder 3. The operation of address translation circuit 5 corresponds to the switching operation, so that an address required in writing of data of the second block as described above is generated.

FIGS. 12A and 12B show operations of address translation circuit 5 as a model. Input A represents address signal ADR of lower 3 bits and input B represents address signal ADR of higher 3 bits. Output A is supplied to row decoder 3 and output B is supplied to column decoder 4.

If control signal SEL is '0', address translation circuit 5 carries out the passing operation as shown in FIG. 12A, and input A and input B are respectively output as output A and output B. If control signal SEL is '1', address translation circuit 5 carries out the switching operation as shown in FIG. 12B, and input A and input B are respectively output as output B and output A.

Referring to FIG. 13, a circuit for generating control signal SEL according to this embodiment is described. A toggle counter is used. The toggle counter is a circuit employed for dividing a signal. The toggle counter is configured of an inverter circuit 16 outputting an inverted value of ADR (5) which is the most significant bit of 6 bits of address signal ADR, and a D flip-flop circuit 17 of one bit.

An output Q of D flip-flop circuit 17 is an output of an inverted value of output Q, and output Q and output Q become respectively '0' and '1' by reset signal RST. Control signal SEL changes synchronously with a block of a pre-stage DCT output to become '0' or '1' alternately for each block. If two blocks correspond to one period, a desired signal can be obtained by inputting a signal with one period corresponding to one block to the toggle counter as a clock signal and applying the dividing operation to the signal. In this embodiment, ADR (5) is used.

ADR (5) has its value changing from 0 to 1 when an address for writing the last data of one block of the pre-stage DCT output is designated, and changing from 1 back to 0 when data of the next block is written. The toggle counter using the D-flip-flop divides a signal synchronously with rising of a signal, and a signal obtained by inverting ADR (5) by inverter circuit 16 is used in order to synchronize the signal with the start of input of each block.

Accordingly, a desired control signal SEL is generated. A JK flip-flop circuit may be used as the flip-flop circuit.

In the two-dimensional array transposition circuit according to the present invention, an amount of memory can be reduced with a scale of a peripheral circuit such as an address translation circuit approximately equivalent to that of the conventional two-dimensional array transposition circuit provided with two memories. As a result, reduction of power consumption of the two-dimensional array transposition circuit is possible, contributing to reduction of power consumption of a two-dimensional orthogonal transformation circuit using a two-dimensional array transposition circuit such as a two-dimensional DCT circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A two-dimensional array transposition circuit comprising:
   a memory cell array in which each element of a two-dimensional array formed of N rows and N columns can be written into a memory cell selected by a row and a column respectively specified by a row address signal and a column address signal synchronously with a clock signal and can be read synchronously with said clock signal from said memory cell, wherein data is read at one of a rising and a falling edge of a clock pulse and data is written at the other edge of the clock pulse;
   a row decoder for said memory cell array;
   a column decoder for said memory cell array; and
   an address translation circuit for successively generating said row address signal and said column address signal and supplying them respectively to said row decoder and said column decoder for each said two-dimensional array, wherein
   said N is $2^i$ (i is a natural number), and
   said address translation circuit includes
   an $N^2$ counter responsive to a system clock signal in synchronization with said clock signal to update an output and responsive to a reset signal to reset an output,
   a toggle counter receiving a prescribed bit of an output from said $N^2$ counter and changing its state, and
   a two-input two-output selector receiving higher i bits and lower i bits from said $N^2$ counter, distributing them depending on an output from said toggle counter, and supplying them to said row decoder and said column decoder.

2. The two-dimensional array transposition circuit according to claim 1, wherein
   said $N^2$ counter increments an output value represented by 2i-bits by one every time writing into said memory cell array and/or reading from said memory cell array are/is carried out, and resets said output value to 0 every time said output value is incremented $N^2$ times, and
   said toggle counter receives the most significant bit of the output from said $N^2$ counter and changes its state.

3. The two-dimensional array transposition circuit according to claim 2, wherein
   said N is 8.

4. The two-dimensional array transposition circuit according to claim 1, wherein
   said N is 8.

5. A two-dimensional orthogonal transformer comprising:
   a first one-dimensional orthogonal transformer for performing one-dimensional orthogonal transformation;
   a memory cell array in which each element of a two-dimensional array formed of N rows and N columns constituted by an output from said first one-dimensional orthogonal transformer can be written into a memory cell selected by a row and a column respectively specified by a row address signal and a column address signal synchronously with a clock signal, and can be read from said memory cell synchronously with said clock signal, wherein data is read at one of a rising and a falling edge of a clock pulse and data is written at the other edge of said clock pulse;
   a row decoder for said memory cell array;
   a column decoder for said memory cell array
   an address translation circuit for successively generating said row address signal and said column address signal and supplying them to said row decoder and said column decoder respectively for each said two-dimensional array; and
   a second one-dimensional orthogonal transformer for successively performing orthogonal transformation for a one-dimensional array constituting said two-dimensional array read from said memory cell array, wherein
   said N is $2^i$ (i is a natural number), and
   said address translation circuit includes
   an $N^2$ counter responsive to a system clock signal in synchronization with said clock signal to update an output and responsive to a reset signal to reset an output,
   a toggle counter receiving a prescribed bit of an output from said $N^2$ counter and changing its state, and
   a two-input two-output selector receiving higher i bits and lower i bits from said $N^2$ counter, distributing them depending on an output from said toggle counter, and supplying them to said row decoder and said column decoder.

6. The two-dimensional orthogonal transformer according to claim 5, wherein
   said $N^2$ counter increments an output value represented by 2i-bits by one every time writing into said memory cell array and/or reading from said memory cell array are/is carried out, and resets said output value to 0 every time said output value is incremented $N^2$ times, and said toggle counter receives the most significant bit of the output from said $N^2$ counter and changes its state.

7. The two-dimensional orthogonal transformer according to claim 6, wherein each of said first one-dimensional orthogonal transformer and said second one-dimensional orthogonal transformer includes a one-dimensional discrete cosine transformer.

8. The two-dimensional orthogonal transformer according to claim 7, wherein said N is 8.

9. The two-dimensional orthogonal transformer according to claim 5, wherein each of said first one-dimensional orthogonal transformer and said second one-dimensional orthogonal transformer includes a one-dimensional discrete cosine transformer.

10. The two-dimensional orthogonal transformer according to claim 9, wherein said N is 8.

11. A two-dimensional array transposition circuit comprising:

a memory cell array formed of memory cells arranged in a matrix in a first direction and a second direction in which writing into said memory cell specified by an address signal and reading from said memory cell can be carried out in a same clock cycle, wherein data is read at one of a rising and a falling edge of a clock pulse and data is written at the other edge of the clock pulse;

an address output circuit switching said address signal of said memory cell array in which priority is given to said first direction and said address signal of said memory cell array in which priority is given to said second direction and successively outputting them every time a two-dimensional array corresponding to one block is written into said memory cell array and read from said memory cell array; and means for reading data from an address designated by an output from said address output circuit and outputting the data, and writing an element of a next two-dimensional array into the address.

12. The two-dimensional array transposition circuit according to claim 11, wherein in said memory cell array, writing of each element of a two-dimensional array formed of N rows and N columns into a memory cell selected by a row and a column respectively specified by a row address signal and a column address signal in synchronization with a clock signal and reading from said memory cell array in synchronization with said clock signal can be carried out in a same clock cycle, said N is $2^i$ (i is a natural number), and said address output circuit includes an $N^2$ counter responsive to a system clock signal in synchronization with said clock signal to update an output and responsive to a reset signal to reset an output, a toggle counter receiving a prescribed bit of an output from said $N^2$ counter and changing its state, and a two-input two-output selector receiving higher i bits and lower i bits from said $N^2$ counter, distributing them depending on an output from said toggle counter, and supplying them to said data reading and writing means.

13. The two-dimensional transposition circuit according to claim 12, wherein said $N^2$ counter increments an output value represented by 2i-bits by one every time writing into said memory cell array and reading from said memory cell array are carried out, and resets said output value to 0 every time said output value is incremented $N^2$ times, and said toggle counter receives the most significant bit of the output from said $N^2$ counter and changes its state.

14. The two-dimensional array transposition circuit according to claim 13, wherein said N is 8.

15. The two-dimensional array transposition circuit according to claim 14, wherein said first direction is a row direction, and said second direction is a column direction.

16. The two-dimensional array transposition circuit according to claim 12, wherein said N is 8.

17. The two-dimensional array transposition circuit according to claim 16, wherein said first direction is a row direction, and said second direction is a column direction.

18. A two-dimensional orthogonal transformer comprising:

a first one-dimensional orthogonal transformer for performing one-dimensional orthogonal transformation;

a memory cell array formed of memory cell& arranged in a matrix in a first direction and a second direction in which writing into said memory cell specified by an address signal and reading from said memory cell can be carried out in a same clock cycle, wherein data is read at one of a rising edge and a falling edge of a clock pulse and data is written at the other edge of said clock pulse;

an address output circuit switching said address signal of said memory cell array in which priority is given to said first direction and said address signal of said memory cell array in which priority is given to said second direction and successively outputting them every time writing and reading of a two-dimensional array corresponding to one block into and from said memory cell array are carried out;

means for reading data from an address designated by an output from said address output circuit and outputting the data, and writing an element of a next two-dimensional array into the address; and a second one-dimensional orthogonal transformer for performing successively one-dimensional orthogonal transformation for a one-dimensional array constituting said two-dimensional array read from said memory cell array.

19. The two-dimensional orthogonal transformer according to claim 18, wherein, in said memory cell array, writing of each element of a two-dimensional array formed of N rows and N columns into a memory cell selected by a row and a column respectively specified by a row address signal and a column address signal in synchronization with a clock signal and reading from said memory cell array in synchronization with said clock signal can be carried out in a same clock cycle, said N is $2^i$ (i is a natural number), and said address output circuit includes an $N^2$ counter responsive to a system clock signal in synchronization with said clock signal to update an output, and responsive to a reset signal to reset an output, a toggle counter receiving a prescribed bit of an output from said $N^2$ counter and changing its state, and a two-input two-output selector receiving higher i bits and lower i bits from said $N^2$ counter, distributing them depending on an output from said toggle counter, and supplying them to said data reading and writing means.

20. The two-dimensional orthogonal transformer according to claim 19, wherein said $N^2$ counter increments an output value represented by 2i-bits by one every time writing into said memory cell array and reading from said memory cell array are carried out, and resets said output value to 0 every time said output value is incremented $N^2$ times, and said toggle counter receives the most significant bit of the output from said $N^2$ counter and changes its state.

21. The two-dimensional orthogonal transformer according to claim 20, wherein each of said first one-dimensional orthogonal transformer and said second one-dimensional orthogonal transformer includes a one-dimensional discrete cosine transformer.

22. The two-dimensional orthogonal transformer according to claim 21, wherein said N is 8.

23. The two-dimensional orthogonal transformer according to claim 22, wherein said first direction is a row direction, and said second direction is a column direction.

24. The two-dimensional orthogonal transformer according to claim 19, wherein each of said first one-dimensional orthogonal transformer and said second one-dimensional orthogonal transformer includes a one-dimensional discrete cosine transformer.

25. The two-dimensional orthogonal transformer according to claim 24, wherein said N is 8.

26. The two-dimensional orthogonal transformer according to claim 25, wherein said first direction is a row direction, and said second direction is a column direction.

27. A method of transposing a two-dimensional array using a memory cell array formed of memory cells arranged in a matrix in a first direction and a second direction, wherein data is read at one of a rising and falling edge of a clock pulse and data is written at the other edge of the clock pulse, comprising the steps of:

(A) writing each element of said two-dimensional array corresponding to one block successively into an address of said memory cell array designated according to an address signal in which priority is given to said first direction;

(B) reading data from an address of said memory cell array designated according to an address signal in which priority is given to a direction different from the direction used in writing of each element of said two-dimensional array corresponding to an immediately preceding one block, and writing each element of the two-dimensional array corresponding to a next block to said immediately preceding one block, wherein said reading and said writing are done successively; and repeating said reading and writing step in (B) a prescribed number of times.

28. The method of transposing the two-dimensional array according to claim 27, wherein said first direction is one of a row direction and a column direction, and said second direction is the other of the row direction and the column direction.

* * * * *